United States Patent
Jo et al.

(10) Patent No.: US 11,650,287 B2
(45) Date of Patent: May 16, 2023

(54) JAMMING SIGNAL GENERATING APPARATUS AND METHOD THEREOF

(71) Applicant: AGENCY FOR DEFENSE DEVELOPMENT, Daejeon (KR)

(72) Inventors: Jeil Jo, Daejeon (KR); Junghoon Lee, Daejeon (KR); Hongkyun Yu, Daejeon (KR); Unseob Jeong, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 17/382,698

(22) Filed: Jul. 22, 2021

(65) Prior Publication Data

US 2022/0034997 A1 Feb. 3, 2022

(30) Foreign Application Priority Data

Jul. 30, 2020 (KR) .......................... 10-2020-0095570

(51) Int. Cl.
*G01S 7/38* (2006.01)
*H04K 3/00* (2006.01)

(52) U.S. Cl.
CPC .................. *G01S 7/38* (2013.01); *H04K 3/43* (2013.01); *H04K 3/82* (2013.01)

(58) Field of Classification Search
CPC ........ G01S 7/38; G01S 13/584; G01S 13/282; G01S 7/023; G01S 13/34; H04K 3/43; H04K 3/82
See application file for complete search history.

(56) References Cited

U.S. PATENT DOCUMENTS

| 4,642,643 A | * | 2/1987 | Wise ........................ H04K 3/22 342/13 |
| 6,100,838 A | * | 8/2000 | Richmond ................ G01S 7/36 342/17 |
| 7,652,616 B2 | * | 1/2010 | Inaba .................... G01S 13/931 342/112 |

(Continued)

FOREIGN PATENT DOCUMENTS

| KR | 20-2000-0015270 U | 7/2000 |
| KR | 10-2003-0054594 A | 7/2003 |
| KR | 10-2100851 B1 | 4/2020 |

OTHER PUBLICATIONS

Office Action in Korean Patent Application No. 10-2020-0095570 dated Oct. 14, 2021 in 4 pages.

*Primary Examiner* — Erin F Heard
*Assistant Examiner* — Kenneth W Good
(74) *Attorney, Agent, or Firm* — Knobbe, Martens, Olson & Bear, LLP

(57) ABSTRACT

This application relates to a jamming signal generating apparatus. In one aspect, the jamming signal generating apparatus includes a signal analyzer configured to perform measurement and analysis of a radar reception signal, and a radio frequency (RF) source signal output device configured to receive the radar reception signal and to output a video signal by reflecting the measurement and the analysis. The jamming signal generating apparatus may also include a frequency up converter configured to output a jamming signal and a jamming transmission signal measurement device configured to receive the video signal and the jamming signal and to obtain a jamming to signal ratio (JSR).

10 Claims, 2 Drawing Sheets

(56) References Cited

U.S. PATENT DOCUMENTS

| | | | |
|---|---|---|---|
| 8,055,184 B1* | 11/2011 | DiMartino | H04K 3/825 |
| | | | 235/382 |
| 10,107,895 B2* | 10/2018 | Cho | G01S 7/4004 |
| 2019/0317188 A1* | 10/2019 | Lee | G01S 7/32 |
| 2019/0339374 A1* | 11/2019 | Kageme | G01S 13/282 |
| 2019/0363820 A1* | 11/2019 | Zeng | H04K 3/228 |

* cited by examiner

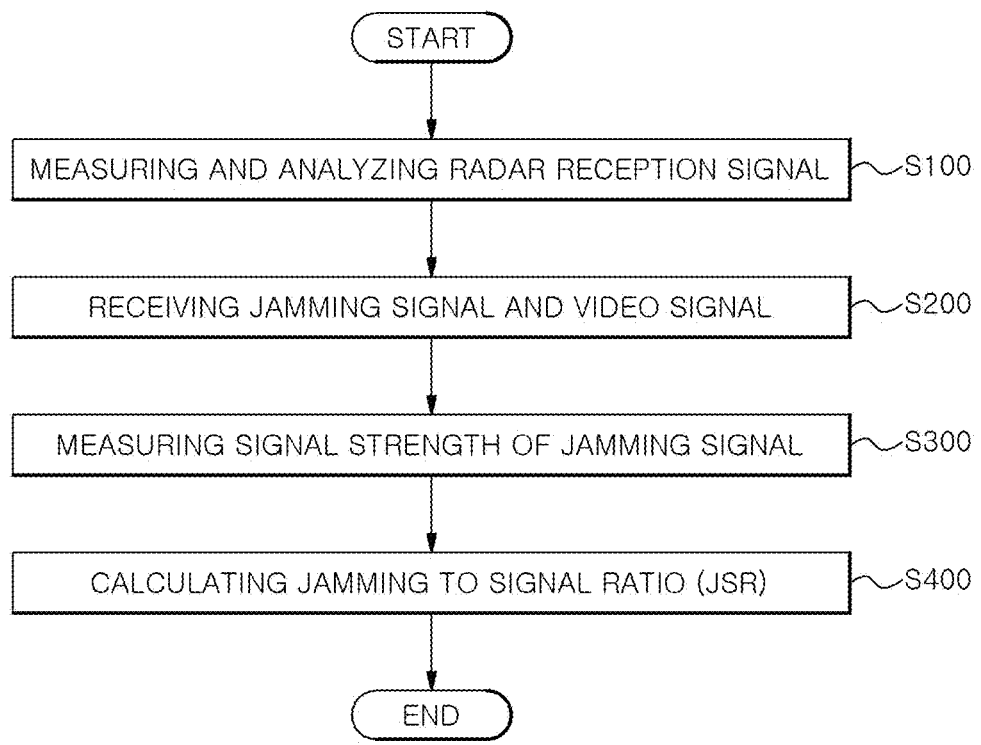

JAMMING SIGNAL GENERATING APPARATUS AND METHOD THEREOF

CROSS-REFERENCE TO RELATED APPLICATION

This application claims priority to Korean Patent Application No. 10-2020-0095570, filed on Jul. 30, 2020. The entire contents of the application on which the priority is based are incorporated herein by reference.

TECHNICAL FIELD

The present disclosure relates to a jamming signal generating apparatus and a jamming signal generating method for measuring signal strength of a jamming signal during jamming.

BACKGROUND

Radar tracks a target by receiving an echo signal, which is a reflected signal from the target. In response, electronic warfare conducts electronic attack on a radar signal to interfere with tracking of the radar. The radar receives the reflected signal from the target and the echo signal at the same time, and the signal strength of the electronic attack and the signal strength of the reflected signal of the radar from the target are expressed as a jamming to signal ratio (JSR).

SUMMARY

The present disclosure provides a jamming signal generating apparatus.

Accordingly, the present disclosure has been devised to solve the problems of the prior art. The present disclosure provides a method of measuring signal strength of a jamming signal during jamming, thereby estimating a jamming to signal ratio (JSR).

However, the problem to be solved of the present disclosure is not limited to those described above, and another problem to be solved that is not described may be clearly understood by those skilled in the art to which the present disclosure belongs from the following description.

In accordance with an aspect of the present disclosure, there is provided a jamming signal generating apparatus, The jamming signal generating apparatus comprises, a signal analyzer configured to perform measurement and analysis of a radar reception signal; a RF source signal output device configured to receive the radar reception signal and to output a video signal by reflecting the measurement and the analysis; a frequency up converter configured to output a jamming signal; and a jamming transmission signal measurement device configured to receive the video signal and the jamming signal and to obtain a jamming to signal ratio (JSR).

Also the jamming transmission signal measurement device is further configured to measure signal strength of the jamming signal if a pulse signal strength of the video signal is greater than a threshold value.

Also the jamming signal generating apparatus further comprises, a transmission controller configured to control output of the RF source signal output device by reflecting the measurement and the analysis, and the JSR.

Also the JSR indicates a ratio of effective radiation output of the jamming signal to signal strength of a reflected signal of the radar reception signal.

Also the signal analyzer is further configured to obtain at least one of signal strength, a frequency, a frequency bandwidth, a pulse width, and a pulse modulation width of the radar reception signal.

In accordance with another aspect of the present disclosure, there is provided a jamming signal generating method, The jamming signal generating method comprises, measuring and analyzing a radar reception signal; receiving a jamming signal and a video signal; measuring signal strength of the jamming signal; and obtaining a jamming to signal ratio (JSR) through the radar reception signal and the jamming signal.

Also the JSR is obtained by an equation $$\frac{J}{S} = \frac{p_J G_j}{P_r \sigma \cdot BT \cdot n_p \cdot \beta \cdot \alpha \cdot L_p} A_e > k,$$

and wherein, the $p$ indicates the signal strength of the jamming signal, the $G_j$ indicates a transmission antenna gain, the $P_r$ indicates signal strength of the radar reception signal, the $\sigma$ indicates a Radar Cross Section (RCS), the BT (bandwidth time product, wherein B indicates a modulation bandwidth, and T indicates a pulse width) indicates a processing gain by a radar matching filter, the $n_p$ indicates the cumulative number of pulses, the $\beta$ indicates a ratio of a jamming bandwidth of jamming to a reception bandwidth of radar, the $\alpha$ indicates an error correction term in consideration of a measurement error of the radar and an error of a jamming transmission signal measurement device, the $L_p$ indicates a polarization loss of the jamming signal and the radar reception signal, and the $A_e$ indicates an effective cross-sectional area of a reception antenna.

Also the signal strength of the jamming signal is adjusted if the JSR is smaller than the k.

Also the obtaining the JSR is performed without stopping receiving the radar reception signal.

Also the measuring and analyzing the radar reception signal is measuring at least one of signal strength, a frequency, a bandwidth, a pulse modulation width, and the cumulative number of pulses of the radar reception signal.

According to an embodiment of the present disclosure, a method of estimating the JSR by measuring the signal strength of the jamming signal during the jamming is provided.

BRIEF DESCRIPTION OF THE DRAWINGS

FIG. 2 represents a flowchart illustrating a jamming signal generating method according to an embodiment of the present disclosure.

DETAILED DESCRIPTION

Figure 1:
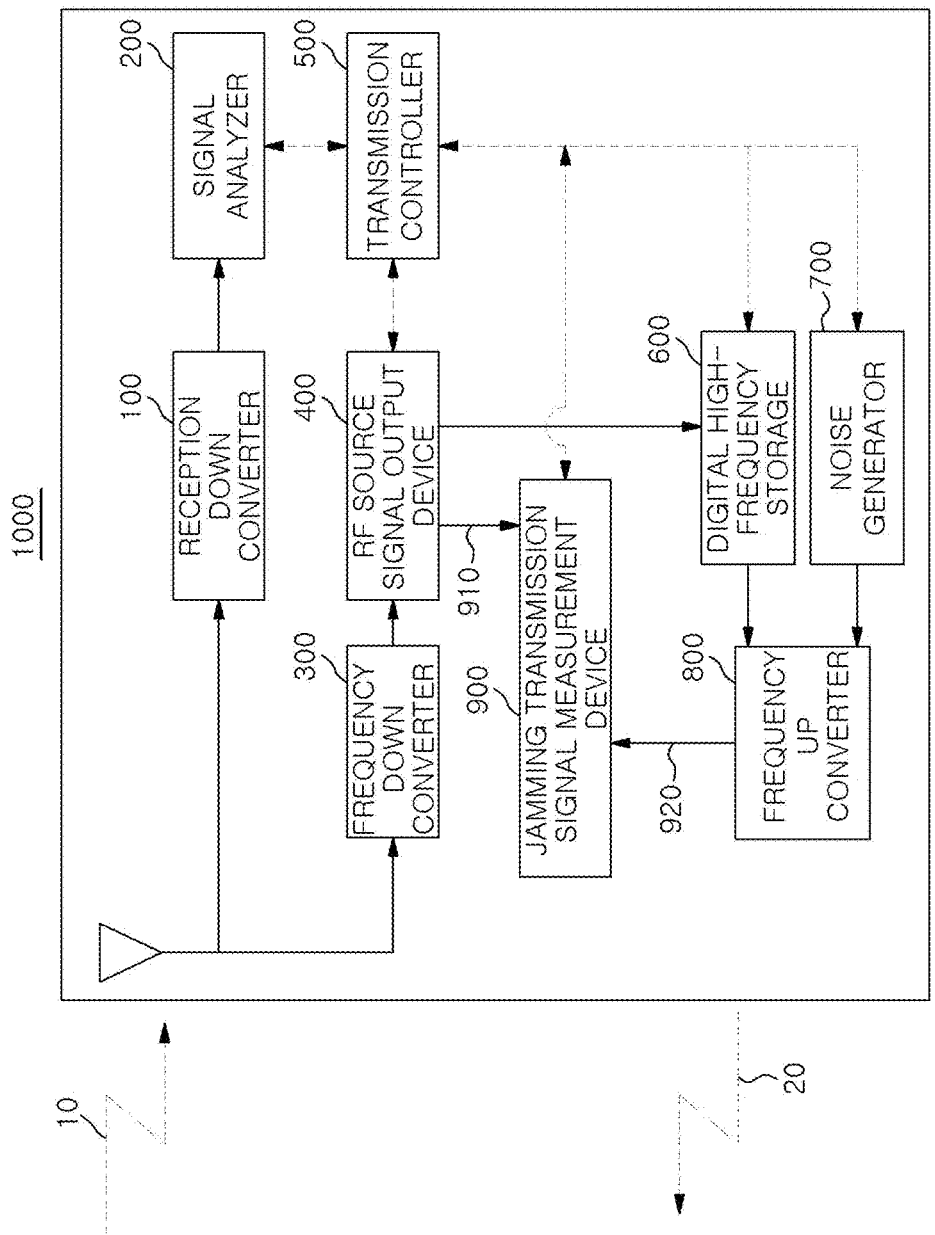
FIG. 1 describes a block diagram illustrating a configuration of a jamming signal generating apparatus according to an embodiment of the present disclosure.

When the signal strength of the electronic attack is smaller than that of the reflected signal from the target, the radar can track the target even though it received the electronic attack. However, if the signal strength of the electronic attack is greater than the signal strength of the reflected signal from the target, the radar has difficulty in receiving the target signal. As a result, the radar cannot track the target due to the electronic attack and will be directed in a direction other than a direction of the target.

In order to determine whether the electronic attack is successful, a jamming signal generating apparatus stops for a predetermined period of time during the electronic attack and performs look through that identifies whether a radar signal is received. If no more radar signals are received, it is determined that the electronic attack is valid, and jamming is stopped.

The look through method has a disadvantage in that it cannot continuously perform the electronic attack but should stop the electronic attack to determine whether to receive the radar signal. In other words, in the case of stopping the electronic attack, the radar can re-capture the echo signal from the target.

Advantages and features of the present disclosure, and a method of achieving them will become apparent with reference to embodiments described below in detail together with the accompanying drawings. However, it should be noted that the present disclosure is not limited to the embodiments disclosed below, but may be implemented in various forms. It should be noted that the embodiments are provided to make the description of the present disclosure complete, and assist those skilled in the art of the present disclosure to understand the scope of present disclosure, and the present disclosure is defined just by the scope of the claims.

In describing embodiments of the present disclosure, detailed description of publicly-known functions or components will be skipped if they would unnecessarily obscure the features of the present disclosure. Further, the terms to be described below are defined in consideration of their functions of the embodiments of the present disclosure and may vary depending on user's or operator's intention or practice. Therefore, the definition may be made on the basis of the content throughout this application.

A jamming signal generating apparatus 1000 according to an embodiment of the present disclosure will be described with reference to FIG. 1.

FIG. 1 describes a block diagram illustrating a configuration of a jamming signal generating apparatus 1000 according to an embodiment of the present disclosure.

Referring to FIG. 1, the jamming signal generating apparatus 1000 receives a radar reception signal 10 from radar. In addition, the radar reception signal 10 is divided and transmitted into a path for signal analysis and a path for receiving a signal used for jamming. In order to analyze the radar reception signal 10, the radar reception signal 10 is converted to a low frequency band by a reception down converter 100 and is measured and analyzed by a signal analyzer 200. In order to generate a signal used for the jamming, the radar reception signal 10 is converted from a high frequency band to a low frequency band by a frequency down converter 300 and is input into a RF source signal output device 400, and the RF source signal output device 400 outputs a video signal 910 of the radar reception signal 10. The RF source signal output device 400 may output not only the video signal 910 but also, for example, frequency data of the radar reception signal 10 and a limiting RF signal.

A video signal output from the RF source signal output device 400 is input into digital high-frequency storage 600. The digital high-frequency storage 600 performs storing, modulating, and outputting of a video signal output from the RF source signal output device 400 and inputs the signal to a frequency up converter 800. If noise output is required, noise may be generated in the digital high-frequency storage 600 and added into an output signal, or a noise signal generated by a noise generator 700 may be input in the frequency up converter 800 to output a final jamming signal 20. In this case, a transmission controller 500 performs input/output control of the RF source signal output device 400, the digital high-frequency storage 600, and the noise generator 700. The transmission controller 500 performs the input/output control by reflecting a result of measurement and analysis performed by the signal analyzer 200 and a jamming to signal ratio (JSR) to be described later, and the like.

A reflected signal of the radar reception signal 10 is generated according to a Radar Cross Section (RCS) of the radar. Signal strength $P'_s$ of the reflected signal of the radar reception signal 10 by the RCS is calculated by Equation 1.

$$P'_s = \frac{P_t G_t}{4\pi R^2} \sigma \qquad \text{[Equation 1]}$$

Herein, $P_t$ indicates signal strength [Watt] of the radar reception signal 10, $G_t$ indicates a transmission antenna gain of the radar, R indicates a between radar and target distance, and $\sigma$ indicates the RCS [m$^2$].

The radar reception signal 10 is received by the jamming signal generating apparatus 1000 and is divided and inputted into the reception down converter 100 and the frequency down converter 300 for downing a reception frequency. An output signal of the reception down converter 100 is input to the signal analyzer 200 to analyze the radar reception signal 10 and determine whether or not the jamming is performed.

Signal strength $P_r$ of the radar reception signal 10 received by the jamming signal generating apparatus 1000 may be obtained by Equation 2.

$$P_r = \frac{P_t G_t}{4\pi R^2} \frac{\lambda^2}{4\pi} G_r = \frac{P_t G_t}{4\pi R^2} A_e \qquad \text{[Equation 2]}$$

Herein, $\lambda$ indicates a wavelength [m] of the radar, $G_r$ indicates a reception antenna gain of the jamming signal generating apparatus 1000, R indicates a between radar and target distance, and $A_e$ indicates an effective cross-sectional area [$m^2$] of a reception antenna of the jamming signal generating device 1000. If the distance R of Equation 1 is the same distance R of Equation 2, the signal strength of the reflected signal may be reorganized as Equation 3 by using Equation 1 and Equation 2 at a position with the same R.

$$P'_s = \frac{\sigma P_r}{A_e} \qquad \text{[Equation 3]}$$

In addition, effective radiation output $P_J$ of a jamming signal 920 output from the jamming signal generating apparatus 1000 is expressed by the signal strength of the jamming signal 920 and the gain of the transmission antenna as shown in Equation 4.

$$P_J = p_J G_J \qquad \text{[Equation 4]}$$

Herein, $G_J$ indicates the transmission antenna gain of the jamming signal generating apparatus 1000, and $p_J$ indicates the signal strength of the jamming signal 920.

In general, in order for the jamming to be effective, the JSR may be greater than a constant k. In other words, JSR>k may be satisfied, and in the end $P_J/P'_s$>k may be satisfied. If the JSR is smaller than k, input/output is adjusted by the transmission controller 500. Herein, in order to estimate the JSR, a reception characteristic of the radar may be added. Accordingly, a ratio β of a jamming bandwidth of the jamming to a reception bandwidth of the radar, a processing gain by a matching filter of the radar (bandwidth time product: BT, herein, B indicates a modulation bandwidth, and T indicates a pulse width), the cumulative number of pulses $n_p$, and an error correction term α in consideration of a radar measurement error of the jamming signal generating apparatus 1000 and an error of a jamming transmission signal measurement device 900 may be added. In addition, a polarization loss $L_p$ of the jamming signal 920 and the radar reception signal 10 may be added. Eventually, the JSR may be obtained by Equation 5, and the jamming signal generating apparatus 1000 may estimate the JSR, thereby performing the jamming without performing look through.

$$\frac{J}{S} = \frac{p_J G_j}{P_r \sigma \cdot BT \cdot n_p \cdot \beta \cdot \alpha \cdot L_p} A_e > k \qquad \text{[Equation 5]}$$

A jamming signal generating method according to an embodiment of the present disclosure will be described with reference to FIGS. 1 and 2. Specifically, a process of calculating and estimating the JSR in order to generate the final jamming signal 20 without performing the look through will be described. Overlapping description with the above description will be simplified or skipped.

FIG. 2 represents a flowchart illustrating a jamming signal generating method according to an embodiment of the present disclosure.

First, in a step S100, the radar reception signal 10 is measured and analyzed by the signal analyzer 200. Through measurement and analysis for a signal received from radar, the signal analyzer 200 generally obtains signal strength $P_r$, a frequency f, a frequency bandwidth BW, a pulse width T, and a pulse modulation width B of the radar reception signal 10, etc.

Thereafter, in a step S200, the jamming transmission signal measurement device 900 receives the jamming signal 920 and the video signal 910. The jamming transmission signal measurement device 900 receives the video signal 910 output from the RF source signal output device 400 and receives the jamming signal 920 from the frequency up converter 800.

Thereafter, in a step S300, The jamming transmission signal measurement device 900 is measured the strength of the jamming signal 920. If the video signal 910 output from the RF source signal output device 400 is input to the jamming transmission signal measurement device 900 and pulse signal strength of the video signal is greater than a threshold value, the jamming transmission signal measurement device 900 receives the jamming signal 920 transmitted from the frequency up converter 800, and measures the signal strength of the jamming signal 920. At this time, the measured signal strength indicates $P_j$.

Thereafter, in a step S400, the jamming transmission signal measurement device 900 obtains a jamming to signal ratio (JSR) through the radar reception signal 10 and the jamming signal 920.

The jamming transmission signal measurement device 900 receives data used for calculating the JSR from the signal analyzer 200.

The jamming transmission signal measurement device 900 receives the signal strength $P_r$, the frequency f, the pulse width T, the pulse modulation width B, and the cumulative number of pulses $n_p$ of the radar reception signal 10 analyzed by the signal analyzer 200. In addition, the jamming transmission signal measurement device 900 receives a Radar Cross Section (RCS) σ, a jamming bandwidth used for calculating a ratio β of the jamming bandwidth to a reception bandwidth of the radar, and a jamming transmission antenna gain $G_j$. In general, the reception bandwidth of the radar is inversely proportional to the pulse width, which is expressed as $BW_r = 1/T$. In addition, the jamming transmission signal measurement device 900 may receive an error correction term α in consideration of a radar measurement error of the jamming signal generating apparatus 1000 and an error of the jamming transmission signal measurement device 900.

The jamming transmission signal measurement device 900 may calculate the JSR by inputting the received values into Equation 5.

The above description just illustrates the technical idea of the present disclosure, and it will be understood by those skilled in the art to which this present disclosure belongs that various changes and modifications may be made without departing from the scope of the essential characteristics of the present disclosure. Therefore, the embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as being defined in the following claims, and all technical ideas that fall within the scope equivalent thereto should be construed as being embraced by the scope of the claims of the present disclosure.

What is claimed is:

1. A jamming signal generating apparatus comprising:
   a signal analyzer configured to perform measurement and analysis of a radar reception signal;
   a radio frequency (RF) source signal output device configured to receive the radar reception signal and to output a video signal based on the measurement and the analysis;
   a frequency up converter configured to output a jamming signal; and
   a jamming transmission signal measurement device configured to receive the video signal and the jamming signal and to obtain a jamming to signal ratio (JSR).

2. The apparatus of claim 1, wherein the jamming transmission signal measurement device is further configured to measure signal strength of the jamming signal in response to a pulse signal strength of the video signal being greater than a threshold value.

3. The apparatus of claim 1, further comprising:
   a transmission controller configured to control output of the RF source signal output device by reflecting the measurement and the analysis, and the JSR.

4. The apparatus of claim 1, wherein the JSR indicates a ratio of effective radiation output of the jamming signal to signal strength of a reflected signal of the radar reception signal.

5. The apparatus of claim 1, wherein the signal analyzer is further configured to obtain at least one of signal strength, a frequency, a frequency bandwidth, a pulse width, or a pulse modulation width of the radar reception signal.

6. A jamming signal generating method comprising:
   measuring and analyzing a radar reception signal;

receiving the radar reception signal and outputting a video signal based on the measurement and analysis of the radar reception signal;

receiving a jamming signal;

measuring signal strength of the jamming signal; and obtaining a jamming to signal ratio (JSR) based on the video signal and the jamming signal.

7. The method of claim 6, wherein the JSR is obtained by an equation $$JSR = \frac{p_j G_j}{P_r \sigma \cdot BT \cdot n_p \cdot \beta \cdot \alpha \cdot L_p} A_e > k,$$

and wherein, $p_J$ the indicates the signal strength of the jamming signal, the $G_j$ indicates a transmission antenna gain, the $P_r$ indicates signal strength of the radar reception signal, the $\sigma$ indicates a radar cross section (RCS), the BT (bandwidth time product, wherein B indicates a modulation bandwidth, and T indicates a pulse width) indicates a processing gain by a radar matching filter, the $n_p$ indicates the cumulative number of pulses, the $\beta$ indicates a ratio of a jamming bandwidth of jamming to a reception bandwidth of radar, the $\alpha$ indicates an error correction term in consideration of a measurement error of the radar and an error of a jamming transmission signal measurement device, the $L_p$ indicates a polarization loss of the jamming signal and the radar reception signal, and the $A_e$ indicates an effective cross-sectional area of a reception antenna.

8. The method of claim 7, wherein the signal strength of the jamming signal is adjusted in response to the JSR being smaller than a constant k.

9. The method of claim 6, wherein obtaining the JSR is performed without stopping receiving the radar reception signal.

10. The method of claim 6, wherein the measuring and analyzing comprises measuring at least one of signal strength, a frequency, a bandwidth, a pulse modulation width, or the cumulative number of pulses of the radar reception signal.

* * * * *